Patented Aug. 17, 1937

2,090,072

UNITED STATES PATENT OFFICE 2,090,072

RECOVERY OF SULPHUR FROM SULPHUROUS GASES

Stanley Robson, Shirehampton, Bristol, and Morris William Travers, Clifton, Bristol, England, assignors to The National Smelting Company Limited, London, England, a joint stock company of England No Drawing. Application February 26, 1936, Serial No. 65,918. In Great Britain March 11, 1935

4 Claims. (Cl. 23—226)

The present invention has as its aim the production of sulphur from sulphurous gases or sulphur bearing gases produced by the roasting of sulphide ores, or from other sources.

The gases resulting from the roasting of sulphide ores usually contain a comparatively small percentage of sulphur dioxide mixed with a large percentage of nitrogen and a certain amount of oxygen and other permanent gases. A method of dealing with these sulphurous gases has been to convert the sulphur dioxide into sulphuric acid which is sold as such, but where the main objective of the sulphide ore roasting is the recovery of metals and there is no local outlet for the sulphuric acid the disposal of the latter often presents a problem on account of the high cost of transport. Accordingly, attempts have been made over a number of years to separate the sulphur gases from the roasting of sulphide ores in the form of elemental sulphur which can be transported as ordinary merchandise.

In order to avoid uneconomic expenditure of fuel in heating the large quantities of permanent gases contained in the crude roast gases to the temperature necessary for reduction and to avoid attenuation of the sulphur gases prior processes have involved separating the sulphur gases from the permanent gases by some method of absorption of the sulphur dioxide as such in an aqueous solution and its subsequent liberation therefrom.

In this connection a process has been proposed in which the sulphur dioxide is separated from the permanent gases by absorbing it in a solution containing ammonium sulphite and bisulphite, and by an increase of temperature of the sulphite-bisulphite mixture releasing the sulphur dioxide which is then passed, along with sufficient air to maintain the reduction temperature, through heated coke. In another process proposed hitherto the sulphur dioxide is separated from the permanent gases by passing the mixed gases through a tower in countercurrent to water and sulphur dioxide is obtained from the resultant aqueous solution in admixture with reducing gases such as producer gas, water gas or coke oven gas by passing these gases in countercurrent through a tower against the aqueous solution of sulphur dioxide. It was then proposed to use the reducing gases for the reduction of the sulphur dioxide to sulphur.

In contradistinction to these earlier proposals, the process according to this invention involves as a first step the separation of sulphur gases from the permanent gases, such as oxygen and nitrogen in roaster gases produced by the roasting of sulphide ores or from other sources, by oxidizing the sulphur compounds to sulphur trioxide or sulphuric acid or the product known as fuming sulphuric acid which may be easily separated from the permanent gases by well known methods. By vaporizing any or all of these products a sulphur bearing gas is obtained without dilution by nitrogen or other inert gases.

Accordingly the invention broadly stated comprises in combination the following steps:—

Oxidizing sulphur dioxide in sulphurous gases and separating sulphur trioxide or sulphuric acid from the permanent gases and finally reducing the sulphur trioxide or sulphuric acid to elemental sulphur.

In one form of the invention the sulphur trioxide or sulphuric acid in vapor form is brought into contact with hot carbon or carbonaceous material (for example, in an apparatus similar to a water gas generator at a temperature of 500 to 800° C.). This reaction proceeds spontaneously because the gases contain sufficient oxygen to maintain the temperature in the reduction operation so that only an initial heating of the reaction chamber to initiate the reaction is necessary.

According to another form of the invention, the sulphur trioxide or sulphuric acid is reduced by means of hydrogen, carbon monoxide, methane, or hydrocarbon gas or vapor, or other gaseous reducing agent. A mixture of gases, such as coal gas, water gas, natural gas, or producer gas may, for economic reasons, be used in place of any of the reducing agents referred to above. The sulphuric acid or sulphur trioxide may be introduced into the reaction chamber in the form of vapor or spray. To maintain a suitable reaction temperature, the reactants may be heated before or after being brought together which may be effected by some well known form of recuperator or regenerator or by the combustion of part of the reducing agent with air. The reactions take place most rapidly in contact with heated solid surfaces such as brickwork or oxide of iron, or of similar substances described as catalysts, so that the processes are preferably carried out by introducing the gases into chambers loosely packed with such materials.

By control of the proportions of the reactants and by passing the hot gases through chambers containing suitable catalytic material (for example oxides of iron and alumina) the formation of by products such as carbon bisulphide and carbon oxysulphide may be controlled.

What we claim is:—

1. A process for the treatment of sulphurous gases containing sulphur dioxide associated with considerable quantities of permanent gases which process comprises oxidizing sulphur dioxide contained in the said gases, separating sulphur trioxide from the permanent gases by absorption in sulphuric acid solution, immediately vaporizing the acid and bringing the vapor into contact with hot carbonaceous material at a temperature sufficiently high to effect reduction to elemental sulphur.

2. A process for the treatment of sulphurous gases containing sulphur dioxide associated with considerable quantities of permanent gases which process comprises oxidizing sulphur dioxide contained in the said gases, separating sulphur trioxide from the permanent gases by absorption in sulphuric acid solution, immediately vaporizing the acid and bringing the vapor into contact with a hot gaseous reducing agent at a temperature sufficiently high to effect reduction to elemental sulphur.

3. A process for the treatment of sulphurous gases containing sulphur dioxide associated with considerable quantities of permanent gases which process comprises oxidizing sulphur dioxide contained in the said gases, separating sulphur trioxide from the permanent gases by absorption thereof in water and immediately spraying the product into a reduction chamber containing a hot reducing agent at a temperature sufficiently high to effect reduction to elemental sulphur.

4. A process for the treatment of sulphurous gases containing sulphur dioxide associated with considerable quantities of permanent gases which process comprises oxidizing sulphur dioxide contained in the said gases, separating sulphur trioxide from the permanent gases by absorption thereof in sulphuric acid and immediately spraying the product into a reduction chamber containing a hot solid carbonaceous reducing agent at a temperature sufficiently high to effect reduction to elemental sulphur.

STANLEY ROBSON.
MORRIS W. TRAVERS.